(12) United States Patent
Singh

(10) Patent No.: US 8,775,663 B1
(45) Date of Patent: Jul. 8, 2014

(54) DATA REPLICATION NETWORK TRAFFIC COMPRESSION

(75) Inventor: Vijay Singh, Sunnyvale, CA (US)

(73) Assignee: Netapp, Inc., Sunnyvale, CA (US)

( * ) Notice: Subject to any disclaimer, the term of this patent is extended or adjusted under 35 U.S.C. 154(b) by 1379 days.

(21) Appl. No.: 11/740,032

(22) Filed: Apr. 25, 2007

(51) Int. Cl.
G06F 15/16 (2006.01)
H04L 29/06 (2006.01)
H04L 29/08 (2006.01)

(52) U.S. Cl.
CPC ....... H04L 29/0604 (2013.01); H04L 29/08045 (2013.01)
USPC ........... 709/232; 709/227; 709/228; 709/230; 709/247

(58) Field of Classification Search
CPC ...................... H04L 29/0604; H04L 29/08045
See application file for complete search history.

(56) References Cited

U.S. PATENT DOCUMENTS

| | | | | |
|---|---|---|---|---|
| 5,276,898 A | * | 1/1994 | Kiel et al. ...................... | 709/236 |
| 5,521,597 A | * | 5/1996 | Dimitri ............................ | 341/51 |
| 5,742,773 A | * | 4/1998 | Blomfield-Brown et al. ............................. | 709/228 |
| 5,991,515 A | * | 11/1999 | Fall et al. ...................... | 358/1.15 |
| 6,421,711 B1 | * | 7/2002 | Blumenau et al. ............ | 709/213 |
| 6,473,461 B1 | * | 10/2002 | Wang ........................ | 375/240.16 |
| 6,667,700 B1 | | 12/2003 | McCanne et al. | |
| 6,789,128 B1 | * | 9/2004 | Harrison et al. .............. | 709/246 |
| 7,120,666 B2 | | 10/2006 | McCanne et al. | |
| 2002/0056010 A1 | * | 5/2002 | Lincoln et al. ................ | 709/247 |
| 2002/0085631 A1 | * | 7/2002 | Engwer .......................... | 375/240 |
| 2006/0206542 A1 | * | 9/2006 | Wolfgang et al. ............. | 707/203 |
| 2008/0046616 A1 | * | 2/2008 | Verzunov et al. ............... | 710/68 |

FOREIGN PATENT DOCUMENTS

WO    2006/112844 A1    10/2006

OTHER PUBLICATIONS

Software—NetApp Server Suite—2006.
Technical Overview of SnapDrive—John Phillips—Network Appliance—Sep. 2003—TR-3197.

* cited by examiner

*Primary Examiner* — Patrice Winder
*Assistant Examiner* — Nam Tran
(74) *Attorney, Agent, or Firm* — Perkins Coie LLP

(57) ABSTRACT

An apparatus and method improving effective system throughput for replication of data over a network in a storage computing environment by using software components to perform data compression is disclosed. Software compression support is determined between applications in a data storage computing environment. If supported, compression parameters are negotiated for a communication session between storage systems over a network. Effective system throughput is improved since the size of a compressed lost data packet is less than the size of an uncompressed data packet when a lost packet needs to be retransmitted in a transmission window.

21 Claims, 6 Drawing Sheets

DATA REPLICATION NETWORK TRAFFIC COMPRESSION

FIELD OF INVENTION

The present invention relates to an apparatus and method for negotiating and performing data compression between applications in a data storage computing environment.

BACKGROUND

A storage system, which also may be known as a filer or a file server, is a computer that provides file services relating to the organization of information on storage media such as disks. The storage system includes a storage operating system that implements a file system to logically organize the information as a hierarchical structure of directories and files on the disks. Each "on-disk" file may be implemented as a set of disk blocks configured to store information, whereas the directory may be implemented as a specially-formatted file in that information about other files and directories are stored.

Storage systems may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, storage systems may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

A common type of file system for a storage system is a write in-place file system, in which the locations of the data structures (such as Modes and data blocks) on disk are typically fixed. An Mode may be a data structure used to store information, such as metadata, about a file, whereas the data blocks are structures used to store the actual data for the file. The information contained in an Mode may include information relating to: ownership of the file, access permissions for the file, the size of the file, the file type, and references to locations on disk of the data blocks for the file. The references to the locations of the file data are provided by pointers, which may further reference indirect blocks that, in turn, reference the data blocks, depending upon the quantity of data in the file. Changes to the Modes and data blocks are made "in-place" in accordance with the write in-place file system. If an update to a file extends the quantity of data for the file, an additional data block is allocated and the appropriate Mode is updated to reference that data block.

Another type of file system is a write-anywhere file system that does not overwrite data on disks. If a data block on disk is read from disk into memory and "dirtied" with new data, the data block is written to a new location on the disk to optimize write performance. A write-anywhere file system may initially assume an optimal layout, such that the data is substantially contiguously arranged on the disks. The optimal disk layout results in efficient access operations, particularly for sequential read operations. A particular example of a write-anywhere file system is the Write Anywhere File Layout (WAFL®) file system available from Network Appliance, Inc. The WAFL file system may be implemented within a microkernel as part of the overall protocol stack of the storage system and associated disk storage. This microkernel may be supplied as part of the storage operating system.

A storage operating system generally refers to the computer-executable code operable on a storage system that manages data access. The storage operating system may, in case of a filer, implement file system semantics, such as the Data ONTAP® storage operating system provided by Network Appliance, Inc., of Sunnyvale, Calif. The storage operating system may also be implemented as an application program operating on a general-purpose operating system, such as UNIX® or Windows®, or as a general-purpose operating system with configurable functionality, which is configured for storage applications.

Disk storage may be implemented as one or more storage volumes that comprise physical storage disks, defining an overall logical arrangement of storage space. Currently available storage system implementations can serve a large number of discrete volumes. Each volume may be associated with its own file system.

The disks within a volume may be organized as a Redundant Array of Independent (or Inexpensive) Disks (RAID). RAID implementations enhance the reliability and integrity of data storage through the writing of data "stripes" across a given number of physical disks in the RAID group, and the appropriate storing of parity information with respect to the striped data. In the example of the WAFL® file system, a RAID 4 implementation is advantageously employed, which entails striping data across a group of disks, and storing parity (a data protection value) on a separate disk in the RAID group. A volume typically comprises at least one data disk and one associated parity disk (or possibly data/parity) partitions in a single disk arranged according to a RAID 4, or equivalent high-reliability, implementation. A person of ordinary skill in the art would understand that other RAID implementations can be used, such as RAID-5, RAID-DP, as desired.

A storage system may mirror (i.e. replicate), distribute, or exchange large amounts of data to another storage system across a network. A network may be a local area network (LAN), a wide area network (WAN), the Internet, a wired network, a wireless network, or a computer bus, as desired. The replication of data may be needed for disaster recovery or data distribution, as desired. Since storage systems may each be in different, remote, geographical locations, high latency (i.e. delay) occurs and some data packets may be lost when data is communicated across a network. An undesirable effect of the high latency and lost packets is a decrease in effective system throughput, or data rate, over a network when moving data between storage systems. Effective system throughput decreases since lost packets in a time or transmission window are typically retransmitted by a storage system until they are successfully received by a second storage system across a network. A transmission window may be a maximum amount of data a storage system may receive within a predetermined time frame.

To improve system throughput and overall link utilization, storage systems may use data compression. Conventional storage systems require additional hardware adapters for data compression. The additional hardware results in various incompatible hardware configurations for supporting compression between storage systems.

Therefore, a need exists for exchanging large amounts of data between storage systems across a network while maintaining a high data rate without the undesirable need for additional hardware.

SUMMARY

An apparatus and method improving effective system throughput for replication of data over a network in a storage computing environment by using software components to perform data compression is disclosed. Software compression support is determined between applications in a data storage computing environment. If supported, compression parameters are negotiated for a communication session between storage systems over a network. Effective system throughput is improved since the size of a compressed lost data packet is less than the size of an uncompressed data packet when a lost packet needs to be retransmitted in a transmission window.

BRIEF DESCRIPTION OF THE DRAWINGS

A more detailed understanding of the invention may be had from the following description of the exemplary embodiments, given by way of example, and to be understood in conjunction with the accompanying drawings, wherein.

DETAILED DESCRIPTION OF THE EXEMPLARY EMBODIMENTS

Figure 1A:
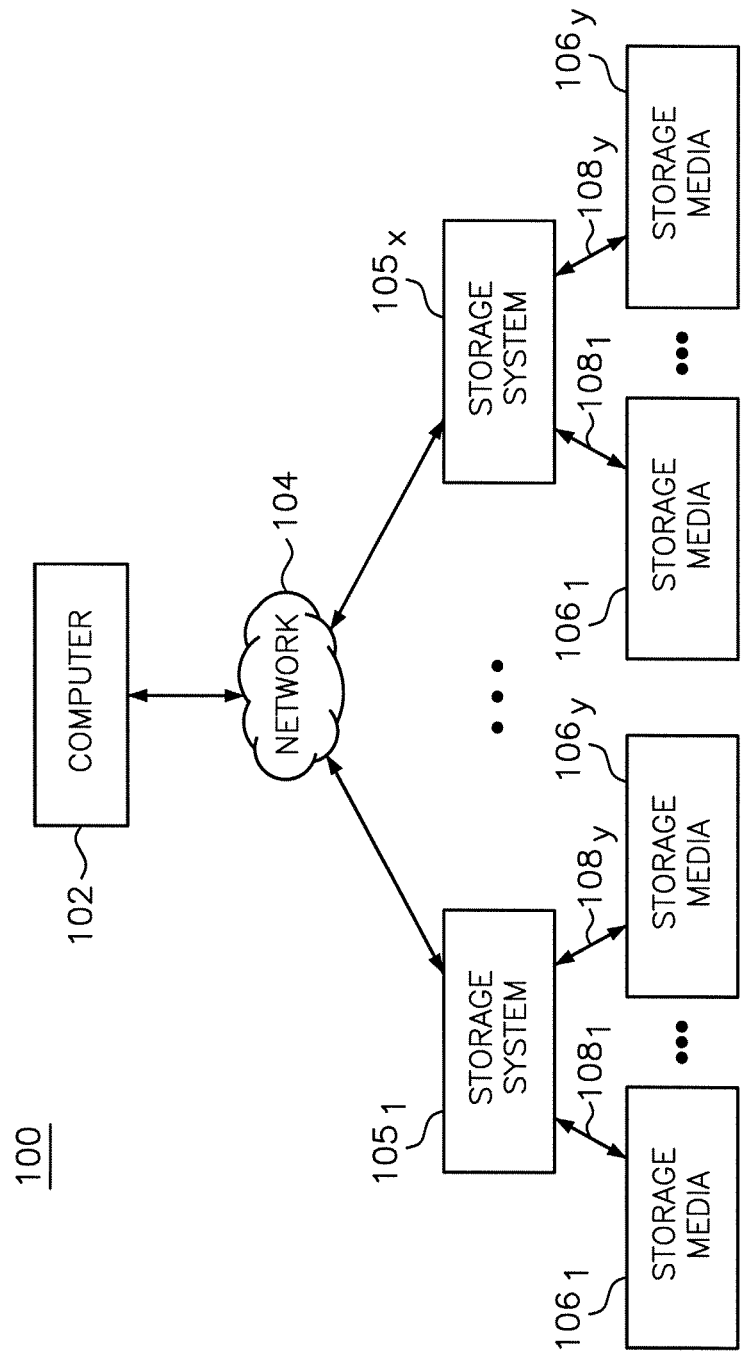
FIG. 1A is a block diagram of a storage computing environment in accordance with an embodiment of the present invention.

The present invention will be described with reference to the drawing figures wherein like numerals represent like elements throughout.
Network Environment FIG. 1A is a block diagram of a storage computing environment 100 that may be configured as a network attached storage (NAS) or storage area network (SAN) environment. Network 104 may be a local area network (LAN), a wide area network (WAN), or a virtual private network (VPN) over the Internet that interconnects computer 102 with storage systems $105_1$ to $105_x$. Computer 102 may communicate read requests, write requests, or any messages to storage systems $105_1$ to $105_x$ over network 104 to access information in at least one of storage media $106_1$ to $106_y$ via links $108_1$ to $108_y$. Storage systems $105_1$ to $105_x$ are configured to control storage and access to data on storage media $106_1$ to $106_y$ via links $108_1$ to $108_y$. Storage media $106_1$ to $106_y$ can be magnetic disks, video tape, optical, DVD, magnetic tape, and any other similar media adapted to store information, including data and data protection information (e.g., parity).

Figure 1B:
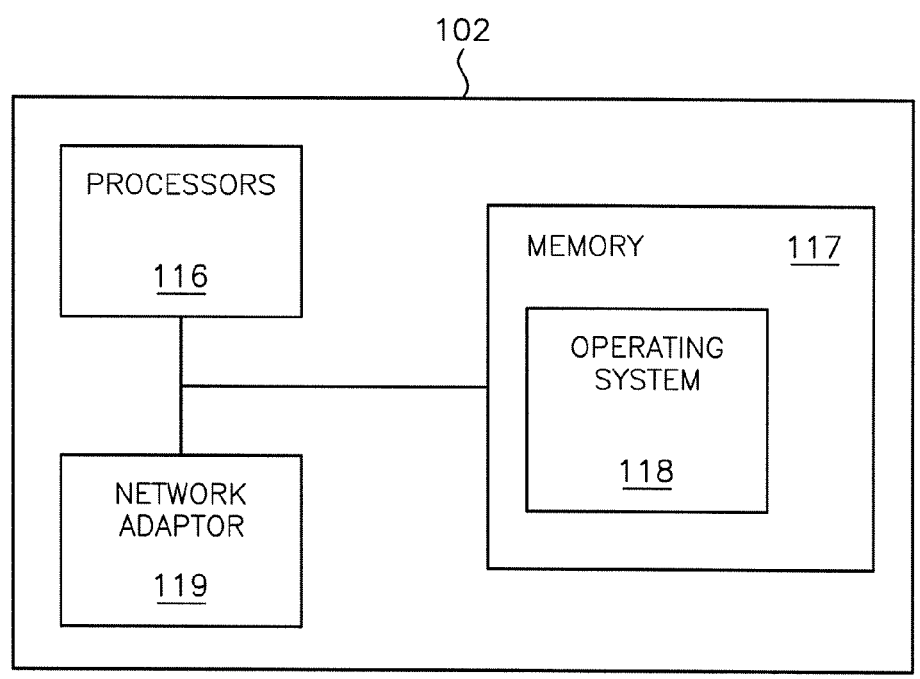
FIG. 1B is a block diagram of a computer in accordance with an embodiment of the present invention.

FIG. 1B is a block diagram of a computer 102 used in accordance with the present invention for communicating read and write requests to a storage system. Computer 102 utilizes services of a storage system to store and manage data on a storage media. Interaction between computer 102 and a storage system can enable the provision of storage services. That is, computer 102 may request the services of the storage system, and the storage system may return the results of the services requested by the computer 102, by exchanging packets over the network 104 (shown in FIG. 1A). Computer 102 includes one or more processors 116, a network adaptor 119, and a memory device 117 having operating system 118. Exemplary operating systems include Microsoft Windows, UNIX, or any operating system configured to perform in a storage computing environment.

Figure 1C:
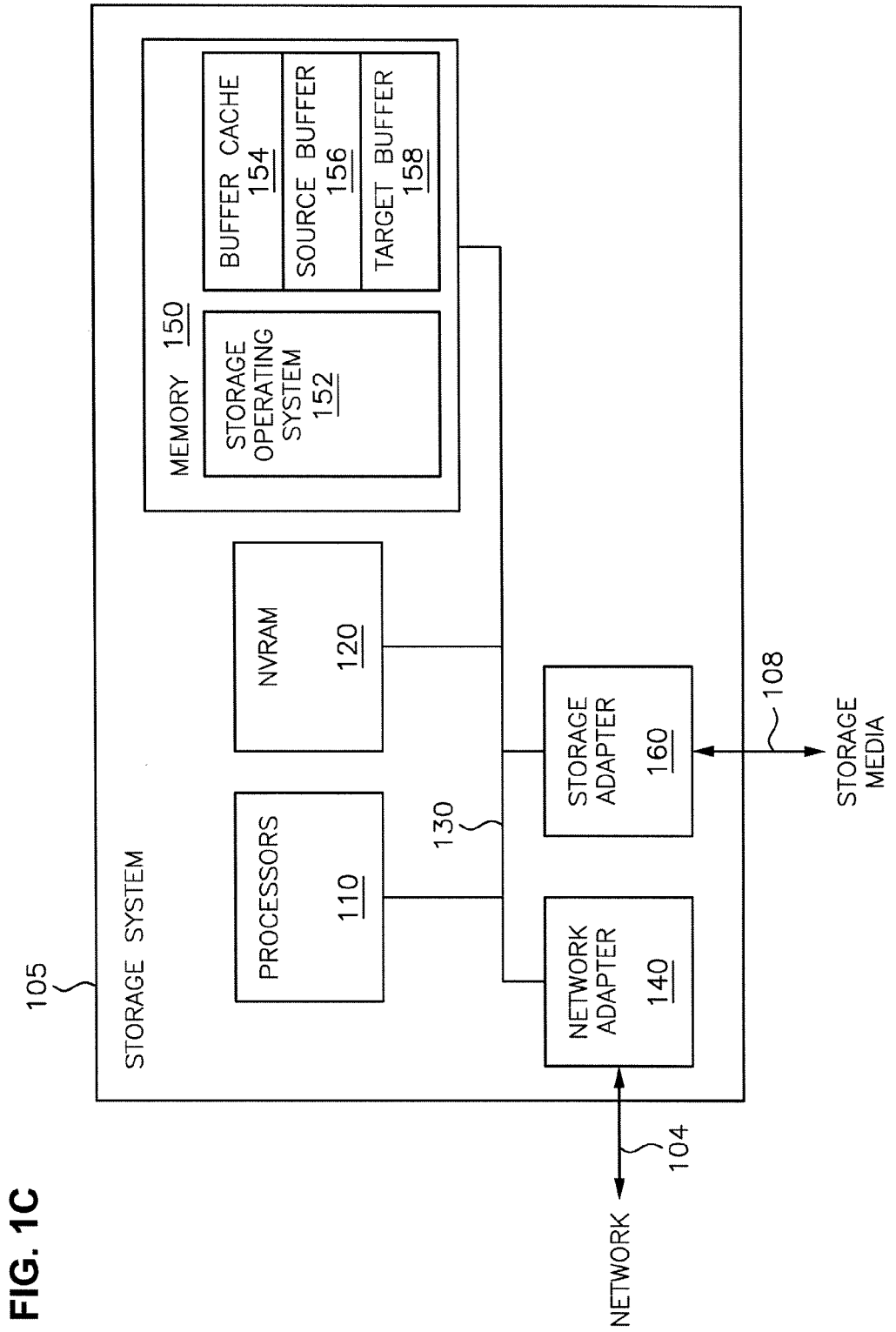
FIG. 1C is a block diagram of a storage system in accordance with an embodiment of the present invention.

Each of the devices attached to network 104 may include an appropriate conventional network interface coupling for communicating over network 104 using a communication protocol, such as Transport Control Protocol/Internet Protocol (TCP/IP), User Datagram Protocol (UDP), Hyper Text Transport Protocol (HTTP), Simple Network Management Protocol (SNMP), or Virtual Interface (VI) connections.
Storage System FIG. 1C is a block diagram of a storage system 105 in accordance with an embodiment of the present invention. Storage system 105 includes processors 110, nonvolatile random access memory (NVRAM) 120, network adapter 140, at least one memory 150, and storage adapter 160, all of which are interconnected by system bus 130. Contained within the memory 150 is at least a portion of storage operating system 152 that implements a file system to logically organize the information as a hierarchical structure of directories and files on storage media $106_1$ to $106_y$. Memory 150 is addressable by processors 110 and adapters 140 and 160 for storing software program code. Storage operating system 152 functionally organizes storage system 105 by invoking storage operations in support of an implemented file service.

Buffer cache, or buffer memory, 154 may be used by storage operating system 152 to temporarily store data for processing. In the case of data compression, data is copied from any one of storage media $106_1$ to $106_y$ and stored in source buffer 156 by the storage operating system 152 by invoking a read operation. The data is then compressed by storage operating system 152 using processors 110 and stored in target buffer 158. The compressed data in target buffer 158 may then be transmitted in packets using network adapter 140 to another storage system over network 104.

Figure 2A:
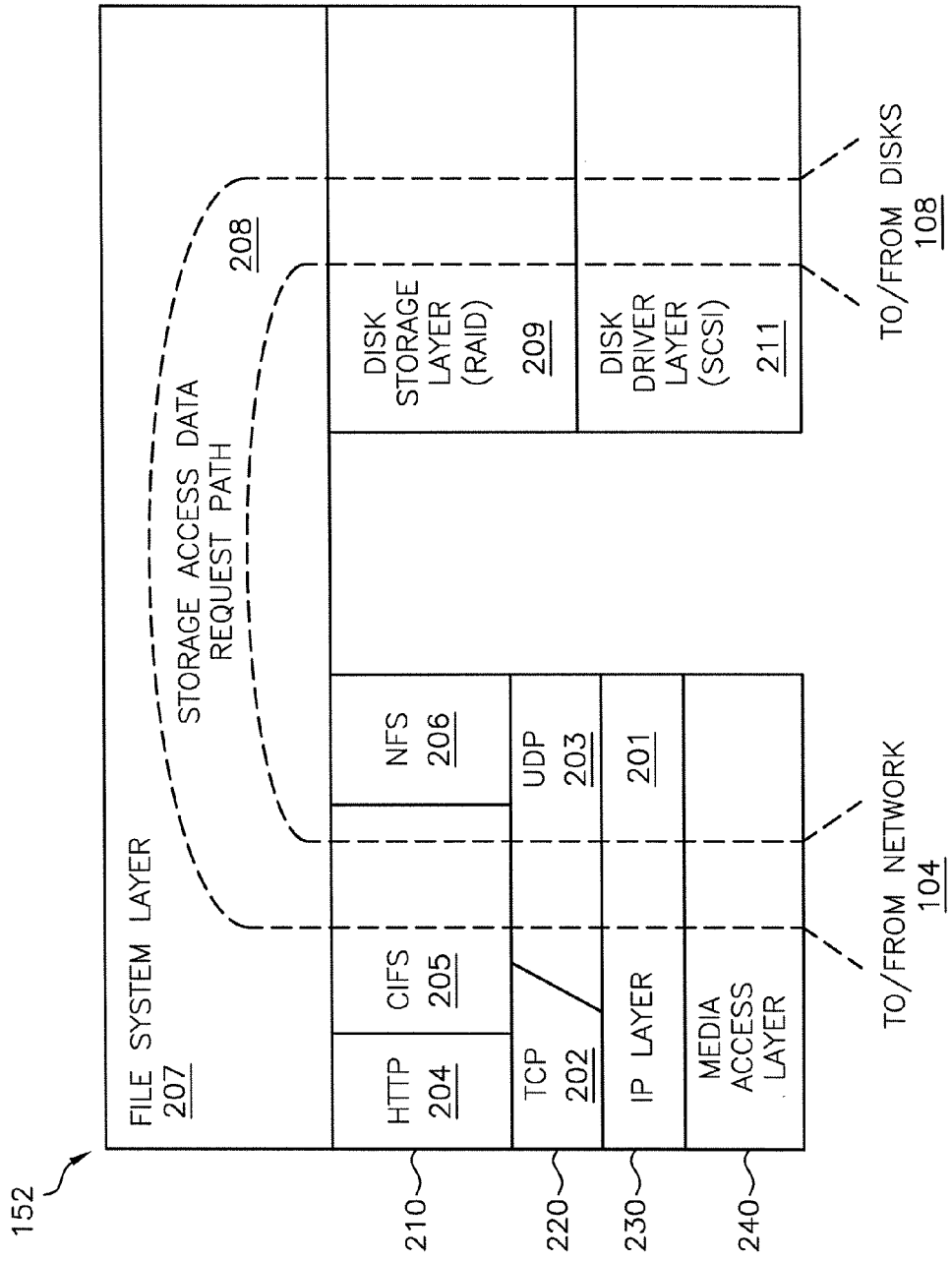
FIG. 2A is a storage operating system architecture in accordance with an embodiment of the present invention.

Storage adapter 160 interoperates with the storage operating system 152 and storage media $106_1$ to $106_y$ to access information requested by computer 102. Storage adapter 160 includes input/output (I/O) interface circuitry that couples to storage media $106_1$ to $106_y$ over an I/O interconnect arrangement, such as a Fibre Channel link. The information is retrieved by storage adapter 160 and may be processed by processors 110 prior to being forwarded over the system bus 130 to the network adapter 140, where the information is formatted into data packets and communicated to computer 102 or another storage system.
Storage Operating System FIG. 2A is architecture of storage operating system 152 in accordance with an embodiment of the present invention. The architecture comprises a series of software layers, including a media access layer 240 of network drivers (e.g., an Ethernet driver). The architecture further includes a network protocol layer 230, such as an Internet Protocol (IP) 201, and transport layer 220, such as Transport Control Protocol (TCP) 202 or User Datagram Protocol (UDP) 203.

An application layer 210 provides multi-protocol data access and includes support for the Network File System (NFS) protocol 206, the Common Internet File System (CIFS) protocol 205 or Hyper Text Transfer Protocol (HTTP) 204. In addition, a disk storage layer 209 implements a disk storage protocol, such as a redundant array of independent disks (RAID) protocol, and a disk driver layer 211 implements a disk access protocol such as, e.g., a Small Computer System Interface (SCSI) protocol for disk based storage media $106_1$ to $106_y$.

Bridging the disk driver layer 211 and disk storage layer 209 with layers 210-240 is a file system layer 207. A file system may provide multiple directories in a single storage volume, each directory containing zero or more filenames. A file system provides a logical/virtual representation of how data (files) are organized on a volume, where data (files) are represented as filenames that are organized in one or more directories. As used herein, the term "file" indicates a container, an object, or any other storage entity that contains a group of related data.

File system layer 207 may implement a Write Anywhere File Layout (WAFL™) file system. However, it is expressly contemplated that any appropriate file system may be enhanced for use in accordance with the inventive principles described herein to facilitate access to disks. As such, where the term "WAFL" is employed, it should be taken broadly to refer to any file system that is otherwise adaptable to the teachings of this invention. As used herein, the term "storage operating system" generally refers to the computer-executable code operable on a computer that manages data access. A storage access data request path 208 is provided between network 104 and storage media link 108 through the various layers of the storage operating system 152. In response to a transaction request, file system layer 207 generates an operation to retrieve requested data from storage media $106_1$ to $106_y$ if the data is not resident in the storage system's memory 150.

If the data is not in the memory 150, file system layer 207 indexes an mode file (not shown in the Figures) using the mode number to access an appropriate entry and retrieves a logical volume block number. File system layer 207 then passes the logical volume block number to the disk storage layer 209. Disk storage layer 209 maps the logical number to a disk block number and sends the disk block number to an appropriate driver (for example, an encapsulation of SCSI implemented on a Fibre Channel disk interconnection) in the disk driver layer 211. The disk driver accesses the disk block number on storage media $106_1$ to $106_y$ and loads the requested data in memory 150 for processing by storage system 105. Upon completing the request, storage system 105 (and storage operating system 152) returns a reply, e.g., an acknowledgement packet defined by the CIFS specification, to computer 102 over network 104.

It is noted that the storage access request data path 208 through the storage operating system layers described above may be implemented in hardware, software, or a combination of hardware and software. For example, the storage access request data path 208 may be implemented as logic circuitry embodied within a field programmable gate array (FPGA) or in an application specific integrated circuit (ASIC). This type of hardware implementation may increase the performance of the file services provided by storage system 105 in response to a file system request issued by computer 102. Moreover, in addition to the layers shown in FIG. 2A other layers or sub-layers may exist in the architecture to provide other services by a storage operating system.

Figure 2B:
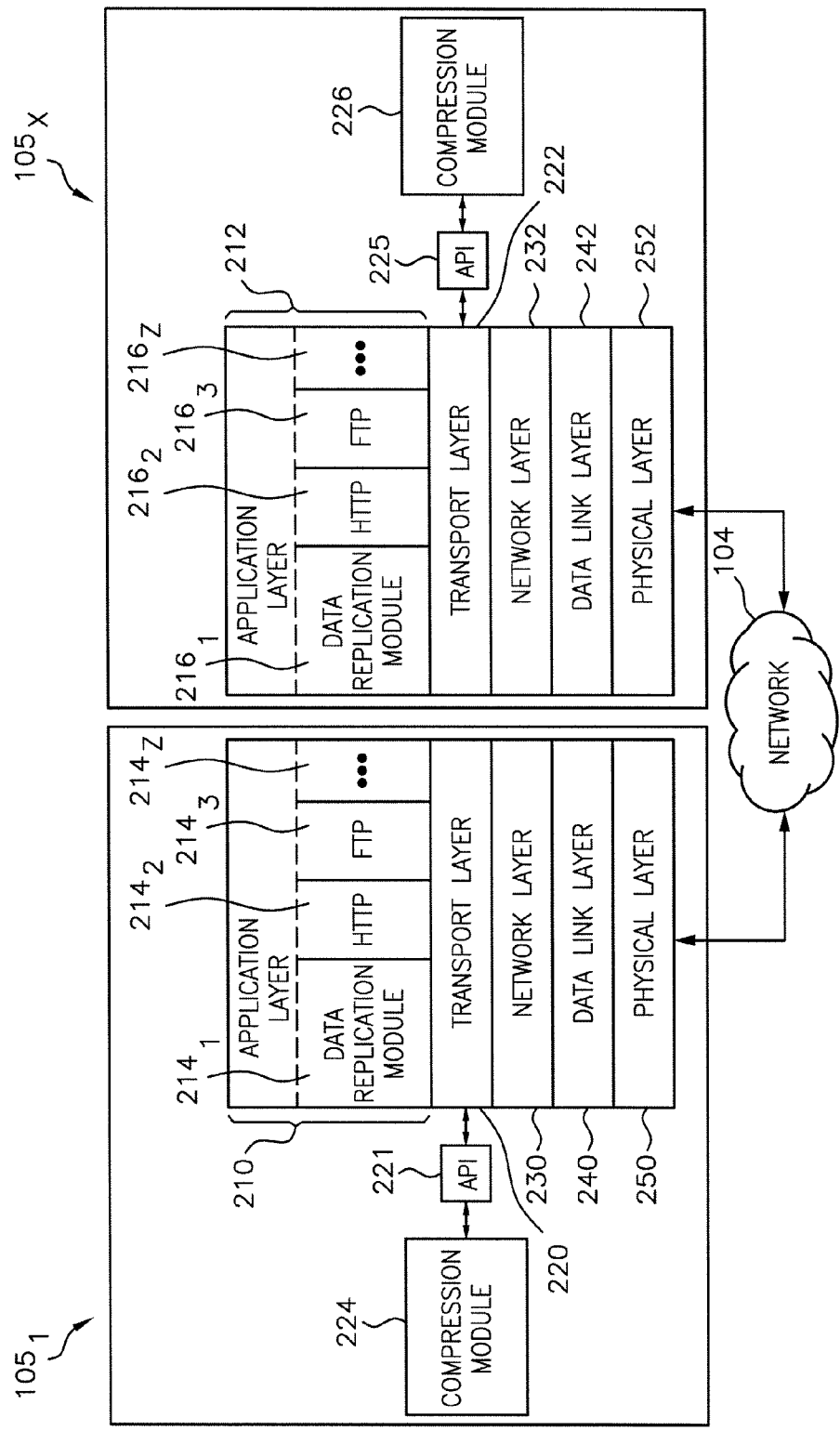
FIG. 2B is a storage system communication architecture supporting compression in accordance with an embodiment of the present invention.

FIG. 2B is a storage system communication architecture supporting compression in accordance with an embodiment of the present invention. In addition to the services provided above for storage operating system 152 in FIG. 2A, layers 210, 220, 230, 240, and 250 handle the transmission of data, such as for data replication, from storage system $105_1$ to storage system $105_x$. Storage system $105_x$ has a storage operating system comprising at least layers 212, 222, 232, 242, and 252 for receiving the data transmitted by storage system $105_1$.

Application layer 210 performs common application services for application processes to ensure that effective communication with another application program in a network is possible. Examples of application layer services may include authentication, error recovery, or determining protocol and data syntax rules with another application. In a storage computing environment, application layer 210 may include a data replication module, Hyper Text Transfer Protocol (HTTP), file transfer protocol (FTP), or any program $214_1$ to $214_z$ for storing, backing up, or accessing data in a storage system.

Transport layer 220 responds to service requests from the application layer 210 and issues service requests to the network layer 230. Transport layer 220 provides transparent transfer of data between hosts, such as between storage systems $105_1$ to $105_x$, and may provide an end-to-end connection, error recovery, flow control, or other quality of service (QoS) functions. As given above, examples of transport layer protocols include transmission control protocol TCP, UDP, Datagram Congestion Control Protocol (DCCP), and Stream Control Transmission Protocol (SCTP). TCP is a virtual circuit protocol where applications on networked computers can create connections to one another to exchange streams of data using stream sockets. Moreover, TCP is a transport protocol that guarantees reliable and in-order delivery of data from source to destination. TCP also distinguishes data for multiple connections by concurrent applications running on the same computer. As a result of TCP QoS functions, any lost packets due to latency or bit errors in a network results in a noticeable drop in throughput especially in storage systems transporting large blocks of data.

Network layer 230 receives data from transport layer 220 and is responsible for end-to-end packet delivery between a source and destination host. As used herein, a "source host" may be a primary storage system $105_1$ and a "destination host" may be a secondary storage system $105_x$. To provide end-to-end packet delivery, network layer 230 may contain network addresses, select routes to send packets, and may provide certain QoS services. A well known network layer protocol is Internet Protocol (IP).

Data link layer 240 manages node-to-node or hop-to-hop packet delivery. Data link layer 240 ensures that an initial connection has been set up, divides data to be transmitted over a network into data frames, and handles the acknowledgements from a destination host that indicate that transmitted data arrived successfully. Physical layer 250 translates packets from data link layer 240 into a signal for transmission over network 104. Physical layer 250 ensures that bits are properly modulated for transmission and that received information is properly demodulated. The aforementioned layers may be a software function or module existing in operating system 152 and may include sub-layers for performing specific services within a layer, as desired.

Various compression and decompression services may be provided by compression modules 224 and 226 provided within storage systems $105_1$ and $105_x$, respectively. Compression and decompression services are provided by compression modules 224 and 226 to transport layers 220 and 222 via application programming interfaces (APIs) 221 and 225. Exemplary compression algorithms used by compression modules 224 and 226 may include those provided by Ziv-Lempel, Lempel-Ziv-Renau (LZR), WinZip®, Phil Katz ZIP (PKZIP), or any other program used to perform data compression. APIs 221 and 225 provide mechanisms for the compression modules to able to communicate and exchange compression related information. In one of embodiment of the invention, compression modules 224 and 226 may be executed and managed by one of processors 110 thereby providing dedicated hardware resources for compression and decompression.

For data replication software modules $214_1$ and $216_1$, multiple transport layer communication sessions between data storage systems $105_1$ and $105_x$ to replicate, update, or move data may be established. SnapMirror® is an example of a data replication software module commercially available by Network Appliance, Inc., of Sunnyvale, Calif. that may be implemented in exemplary embodiments of the present invention. In a communication session for data replication, data in a primary storage media, such as storage media $106_1$, associated with storage system $105_1$ (shown in FIG. 1A) may be replicated and communicated to storage system $105_x$ that stores the replicated data in secondary storage media, such as storage media $106_y$. In the event that data in a primary storage media cannot be accessed by storage system $105_1$ in response to a request by computer 102, the data may be retrieved from a secondary storage media associated with storage system $105_x$.

Compression modules 224 and 226 may establish a different compression algorithm for each transport layer communication session. Effective system throughput is increased if a compressed data packet, unlike a decompressed data packet, is lost since the compressed data packet is smaller than the size of an uncompressed packet in a given transmission window. This becomes advantageous when a lost data packet needs to be retransmitted in a transmission window. A transmission window may be a maximum amount of data transport layers 220 and 222 can receive within a predetermined time frame.

Figure 3:
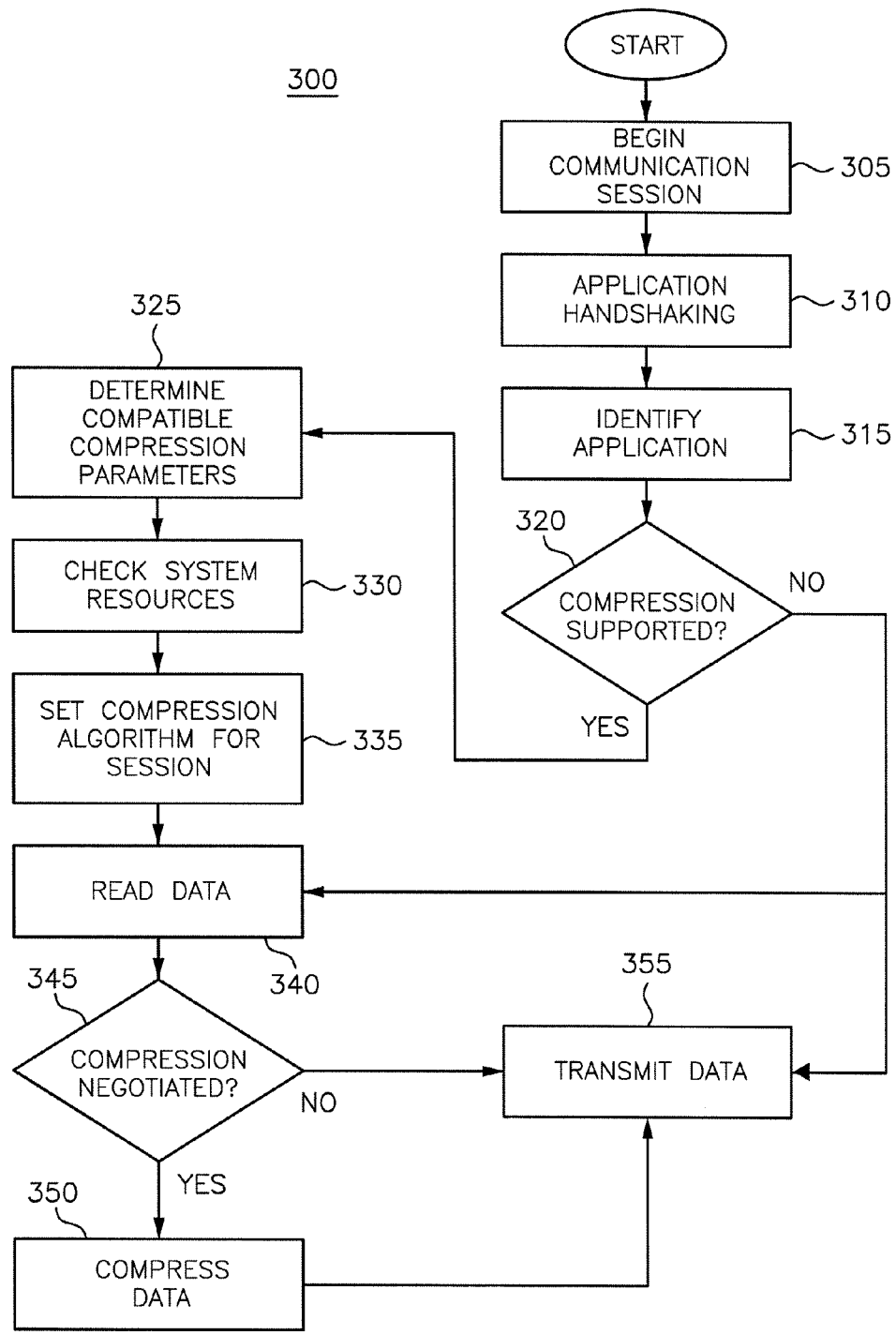
FIG. 3 is a flow diagram of a process for compressing data between storage systems in accordance with an embodiment of the present invention.

FIG. 3 is a flow diagram of a process for compressing data between storage systems $105_1$ and $105_x$ in accordance with an embodiment of the present invention. A communication session is established between transport layers 220 and 222 of storage systems $105_1$ and $105_x$ respectively (step 305) and a handshaking session begins between compression modules 224 and 226 (step 310) via APIs 221 and 225. Storage systems $105_1$ and $105_x$ identify and exchange operating system or replication software version and type information to determine if compression is supported by storage systems $105_1$ and $105_x$ (step 315).

If compression is supported (step 320), compression software modules 224 and 226 determine compatible transport layer compression parameters (step 325) by checking a list of supported compression parameters that may be stored at modules 224 and 226, such as compression types and compression ratios, respectively. Different compression parameters may be chosen individually for each transport layer communication session established by applications $214_1$ to $214_z$ and $218_1$ to $216_z$, respectively. The compression parameters may also be determined by the type and size of each data packet to be transmitted in a communication session or a predetermined user defined compression profile. A user-defined compression profile may comprise predetermined compression types and compression ratios. Based on the agreed upon compression parameters, available system resources are checked in storage system $105_1$ and $105_x$ and any adjustments to the compression type and ratio are made to optimize performance (step 330). System resources include available buffer memory 154 space and recent utilization of processors 110. Based on the negotiated compression parameters and available system resources, a data compression algorithm is chosen for the session (step 335).

The following example will be given for data replication module $214_1$ requesting compression services. However, it is understood to one of ordinary skill in the art that any application layer program may use the aforementioned compression negotiation. For a data replication module requesting compression, data is read from a primary storage media $106_1$ and stored in source buffer 156 by the storage operating system in storage system $105_1$ using a read operation (step 340).

If compression was successfully negotiated (step 345), the data is compressed by compression module 224 using processors 110, formatted for transmission by transport layer 220, and stored in target buffer 158 (step 350). The compressed data in target buffer 158 may then be transmitted using network adapter 140 to storage system $105_x$ that manages a secondary storage media over network 104 via layers 230, 240, and 250. Layers 230, 240, and 250 add header information as known in the art. In addition, these layers provide services to the compressed data for successful transmission such as routing, framing, and modulation (step 355). Correspondingly, layers 232, 242, and 252 process each header related to the layer until the compressed data reaches transport layer 222 where the data is decompressed by compression module 226 using the negotiated compression algorithm. The decompressed data may be provided to data replication module $216_1$ where it may be stored in storage media $106_y$ attached to storage system $105_x$.

If any compressed data packets are lost during transmission, the transport layers may retransmit the packet. The read, compress, and transmit steps repeat for as long as data in a primary storage system changes or a communication session is terminated by a user. As a result, effective system throughput is improved since the size of a compressed lost data packet is less than the size of an uncompressed data packet when a lost packet needs to be retransmitted in a transmission window.

In process 300, since the compression negotiation is performed via transport layers 220 and 222 it is transparent to and performed without applications $214_1$ to $214_z$ and $216_1$ to $216_z$ that reside in application layers 210 and 212, respectively. Applications $214_1$ to $214_z$ simply request data to be transmitted to corresponding applications $216_1$ to $216_z$ to transport layers 220 and 222 that provide any of the mechanisms necessary for successful data transport or compression via modules 224 and 226. In the exemplary embodiment, applications $214_1$ to $214_z$ and $216_1$ to $216_z$ are also not involved in determining compression support between storage systems $105_1$ and $105_x$. Therefore, applications running on storage systems $105_1$ and $105_x$ may be compatible with any negotiated compression parameters and algorithm determined by compression modules 224 and 226.

The present invention can be implemented in a computer program tangibly embodied in a computer-readable storage medium containing a set of instructions and code segments for execution by a processor or a general purpose computer, and method steps of the invention can be performed by a processor executing a program of instructions to perform functions of the invention by operating on input data and generating output data. Suitable processors include, by way of example, both general and special purpose processors. Typically, a processor will receive instructions and data from a read-only memory (ROM), a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method comprising:
receiving, by a first transport layer of a first storage system, data from a first application layer of the first storage system for transmission to a second storage system, wherein the first transport layer is in communication with a first compression module, and wherein utilization of the first compression module is transparent to the first application layer;
establishing, by the first compression module via the first transport layer, a data communication and handshaking session with a second compression module of the second storage system;
exchanging, by the first compression module with the second compression module, information relating to the first and second storage systems during the handshaking session;
negotiating, by the first compression module with the second compression module, compatible data compression parameters including compression ratios based on available system resources including processor utilization of the first storage system and the second storage system;
compressing, by the first compression module, the data received from the first application layer via the first transport layer for data replication and storage in the second storage system by utilizing the negotiated compatible data compression parameters; and
transmitting, by the first transport layer, the compressed data in packets to the second storage system.

2. The method of claim 1 wherein the negotiated compatible data compression parameters are determined by a version and type of operating system configured in the first and second storage systems.

3. The method of claim 1 wherein the negotiated compatible data compression parameters include compression type.

4. The method of claim 1 wherein the negotiated compatible data compression parameters are individually determined for each transport layer communication session.

5. The method of claim 1 wherein the negotiated compatible data compression parameters are determined by a type and size of each data packet to be transmitted in the data communication session.

6. The method of claim 1, further comprising determining data compression support based on operating system information provided in the exchanged information.

7. The method of claim 1 wherein the negotiating performed by the first and second compression modules is transparent to and performed without involving a second application layer associated with the second storage system.

8. The method of claim 1 wherein the available system resources include available memory buffer space.

9. The method of claim 1, further comprising determining a data compression method with the negotiated data compression parameters.

10. A storage system for providing compression in a storage computing environment, the storage system comprising:
a processor;
a memory device coupled to the processor by a communication bus, the memory device having at least a portion of a storage operating system, a source buffer, and a target buffer;
a network adapter coupled to the processor;
a storage adapter coupled to the processor;
wherein the storage operating system includes a communication stack having a transport layer configured to receive data from an application layer, to transparently utilize a compression module without involving the application layer, and to be in communication with the compression module for negotiating data compression parameters with a second storage system, via the network adapter, wherein the negotiated data compression parameters including compression ratios are based on available system resources including available processor capacity of the storage system and the second storage system, and wherein the negotiated data compression parameters are utilized in communication sessions or replicating and transmitting stored data with the second storage system.

11. The storage system of claim 10 wherein the available system resources include available space in the source buffer or in the target buffer.

12. The storage system of claim 10 wherein the negotiated data compression parameters are individually determined for each communication session.

13. The storage system of claim 10 wherein the negotiated data compression parameters are determined by the type and size of each data packet to be transmitted in each communication session.

14. The storage system of claim 10 wherein compression support of the second storage system is determined by the compression module according to the version and type of operating system configured in the second storage system.

15. The storage system of claim 10 wherein the negotiated data compression parameters include compression type.

16. The storage system of claim 10 wherein the compression module and data compression services are provided by a dedicated processor.

17. A non-transitory computer-readable storage medium containing code for execution by a machine, the code comprising:
a first code segment for establishing a data communication session in a storage computing environment by a first compression module via a first transport layer in a first storage system with a second communication module via a second transport layer in a second storage system;
a second code segment for receiving data by the first transport layer from a first application layer in the first storage system;
a third code segment for establishing, by the first compression module via the first transport layer, a data communication and handshaking session with the second compression module of the second storage system;
a fourth code segment for exchanging, by the first compression module with the second compression module, information relating to the first and second storage systems during the handshaking session;
a fifth code segment for negotiating, by the first compression module with the second compression module, compatible data compression parameters including compression ratios based on available system resources including processor utilization of the first storage system and the second storage system;

a sixth code segment for compressing by the first compression module the data utilizing the negotiated data compression parameters without involving the first application layer;

a seventh code segment for transmitting, by the first transport layer~the compressed data in packets to the second storage system; and an eighth code segment for decompressing by the first compression module received data utilizing the negotiated data compression parameters in packets from the second storage system without involving the first application layer.

18. The non-transitory computer-readable storage medium of claim 17, further comprising a ninth code segment for negotiating data compression parameters based on a version and type of operating system configured in the first and second storage systems.

19. The non-transitory computer-readable storage medium of claim 18 wherein the negotiated compatible data compression parameters are individually determined for each transport layer communication session.

20. The non-transitory computer-readable storage medium of claim 17, further comprising a tenth code segment for determining a data compression method based on information exchanged during establishing data communication.

21. A method comprising:

establishing a data replication and storage session between a first storage system and a second storage system;

establishing a data communication session between a first compression module in the first storage system and a second compression module in the second storage system via a first transport layer in the first storage system and a second transport layer in the second storage system;

establishing a data communication and handshaking session between the first compression module and the second compression module;

exchanging information relating to the first and second storage systems during the data communication and handshaking session;

negotiating compatible data compression parameters including compression ratios based on available system resources including available processor capacity of the first storage system and the second storage system;

compressing data stored in the first storage system without involving any application layer in the first storage system;

transmitting, by the first transport layer, the compressed data in packets to the second storage system;

decompressing the compressed data in the second storage system without involving any application layer in the second storage system;

determining that a portion of the compressed data are lost during transmission; and repeating the steps of compressing, transmitting and decompressing for the portion of the compressed data.

\* \* \* \* \*